US006330090B1

(12) United States Patent
Martin et al.

(10) Patent No.: US 6,330,090 B1
(45) Date of Patent: *Dec. 11, 2001

(54) OPTICAL FIBER WAVELENGTH, MULTIPLEXER AND DEMULTIPLEXER

(75) Inventors: Philippe Martin, Pontchartrain; Bernard Laloux, Villepreux; Bertrand Merigot; Hervé Lefevre, both of Paris, all of (FR)

(73) Assignee: Photonetics, Marly le Roi (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/124,222

(22) Filed: Jul. 29, 1998

Related U.S. Application Data

(63) Continuation-in-part of application No. 08/891,971, filed on Jul. 11, 1997.

(30) Foreign Application Priority Data

Feb. 14, 1997 (FR) .................................................. 97 01764

(51) Int. Cl.⁷ ...................................................... H04J 14/02
(52) U.S. Cl. ........................... 359/131; 359/130; 359/127
(58) Field of Search .................................. 359/131, 127, 359/115, 116, 117, 129, 130

(56) References Cited

U.S. PATENT DOCUMENTS 4,472,797 * 9/1984 Nicia ................................... 350/96.19
4,589,740 * 5/1986 Durremberger ...................... 350/487

(List continued on next page.)

FOREIGN PATENT DOCUMENTS 0 067 972 A  5/1982 (EP) .
2 219 869 A  12/1989 (GB) .

OTHER PUBLICATIONS

"32 Channel WDM Multiplexer With 1NM Channel Spacing and 0.7NM Bandwidth", D. R. Wisely, Electronics Letters, vol. 27, No. 6, Mar. 14, 1991, pp. 520–521.
Patent Abstracts of Japan, vol. 011, No. 276 (P–613), Sep. 8, 1987 & JP 62–075406, Fujitsu Ltd., Apr. 7, 1987.

(List continued on next page.)

Primary Examiner—John Tweel, Jr.
(74) Attorney, Agent, or Firm—Arent Fox Kintner Plotkin & Kahn, PLLC

(57) ABSTRACT

The present invention relates to an optical fiber wavelength multiplexing or demultiplexing device comprising:

An optical fiber wavelength multiplexing device comprising:
an array of input single-mode fibers (101 to 105) designed for carrying light beams at different wavelengths ($\lambda 1, \lambda 2, \lambda 2, \ldots, \lambda n$),
an output single-mode fiber (161) designed for carrying the whole set of such light beams,
a dispersing system (107) receiving light beams from the input fibers (101 to 105) in an end plane and generating superimposed light beams designed for the output fiber (161) in an output plane,
an array of converging microlenses (171 to 175) being located in the input plane, whereas a microlens corresponds to each input fiber, wherein the microlens array has the same pitch as the input fiber anlay and produces diverging beams whose respective central axes are parallel and which are directed to a collimating lens (108) which produces parallel collimated beams whose respective central axes are converging on the dispersing system.

The demultiplexer comprises the same elements, whereas the roles of the input/output fibers and planes are reversed.

16 Claims, 8 Drawing Sheets

U.S. PATENT DOCUMENTS

| | | | | |
|---|---|---|---|---|
| 4,708,425 | * | 11/1987 | Gouali et al. | 350/96.16 |
| 4,748,614 | * | 5/1988 | Dammann et al. | 350/96.19 |
| 4,773,063 | * | 9/1988 | Hunsperger et al. | 350/96.11 |
| 5,457,573 | * | 10/1995 | Iida et al. | 359/130 |
| 5,657,406 | * | 8/1997 | Ball | 359/127 |
| 5,724,165 | * | 3/1998 | Wu | 359/117 |
| 5,896,211 | * | 4/1999 | Watanabe | 359/124 |
| 6,084,695 | * | 7/2000 | Martin et al. | 359/131 |

OTHER PUBLICATIONS

"Widely Tunable Single–Longitudinal–Mode Pulsed Dye Laser", I. D. Raymond et al, Optics Letters, vol. 14, No. 20, Oct. 15, 1989, pp. 1116–1118.

"Designs for High Channel Density Single–Mode Wavelength–Division–Multiplexers", G. R. Chamberlin et al, Proceedings of the Spie, vol. 839, 1987, pp. 60–66.

"High–Capacity Wavelength Demultiplexer With a Large-Diameter Grin Rod Lens", B. D. Metcalf et al, Applied Optics, vol. 21, No. 5, Mar., 1982, New York, U.S., pp. 794–796.

Wide Passband Grating Multiplexer for Multimode Fibers, B. Hillerich et al, Journal of Lightwave Technology, vol. 3, No. 3, Jun., 1985, New York, U.S., pp. 590–594.

* cited by examiner

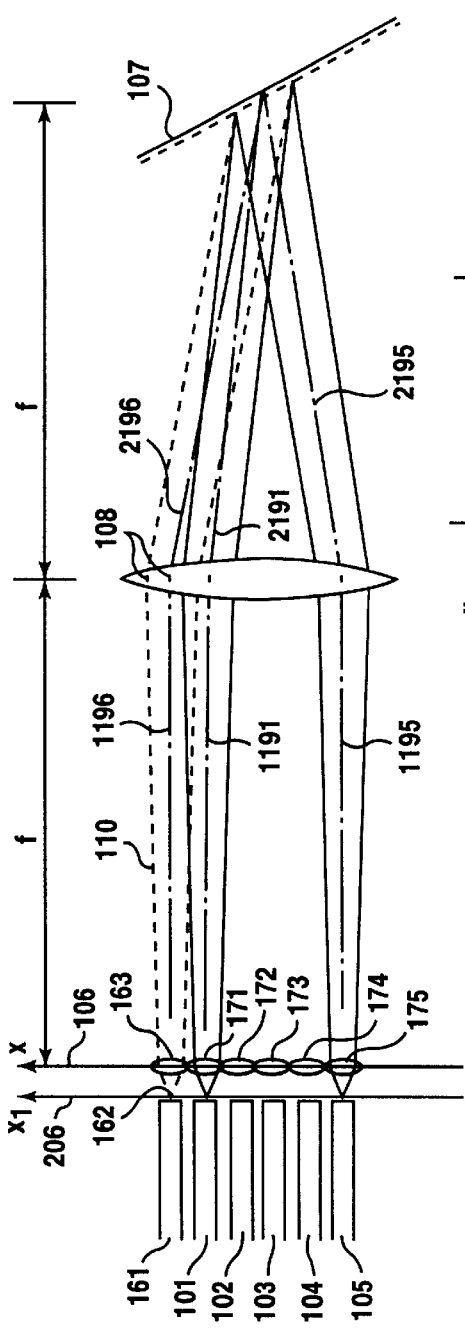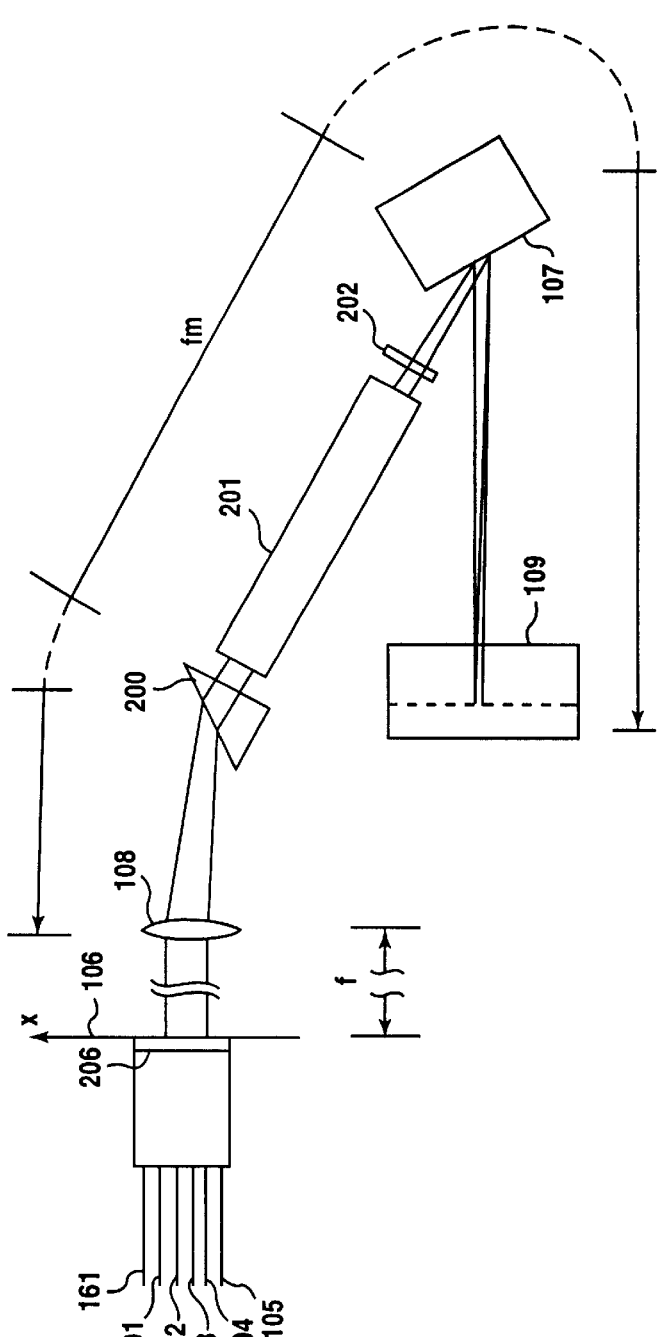

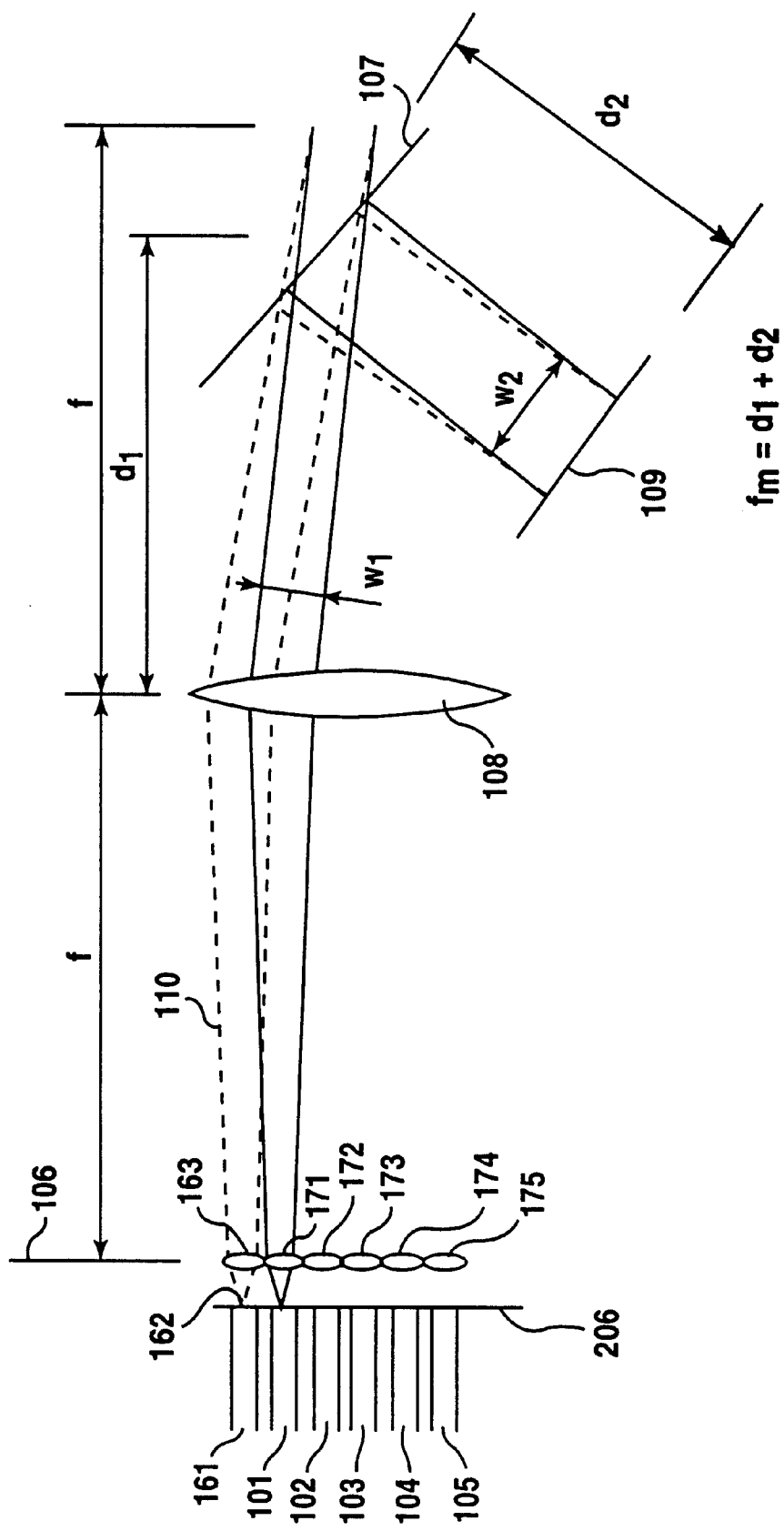

OPTICAL FIBER WAVELENGTH, MULTIPLEXER AND DEMULTIPLEXER

CROSS REFERENCE TO RELATED APPLICATION

This application is a continuation-in-part of U.S. patent application Ser. No. 08/891,971, filed Jul. 11, 1997.

This invention relates to optical fiber wavelength multiplexers and demultiplexers.

These devices become more and more important with the development of optical fiber telecommunications. Indeed, wavelength multiplexing and demultiplexing technologies enable transmission of an increased volume of information in the same optical fiber. Direct optical amplification is now reliable and allows one to amplify a set of channels, at different wavelengths, with a single optical amplifier. It does not require any more to demultiplex the channel wavelengths for amplifying them separately, as it would be the case with electronic amplifiers. Such dense wavelength division multiplexing (D-WDM) is particularly efficient in the 1530 nm–1565 nm window of erbiumi-doped-fiber amplifier (EDFA).

The operation of a device according to the previous art is illustrated on FIGS. 1 and 2. FIG. 1 represents a multiplexer. Input single-mode fibers 1 to 5 have their ends located on a plane 6 constituting the input plane of the multiplexer. This multiplexer comprises a dispersing element or grating 7, a collimation optical element 8, a reflector system 9 and produces an output beam 10 collected by an output single-mode fiber 61. The optical elements of the multiplexer, the grating 7 and the collimation optical elements 8 as well as the reflector optical system 9 are laid out in such a way that the input beams, spatially separate in the input plane 6, are superimposed at the output point 62 and coupled in the output fiber 61. This arrangement with a grating and a reflector is usually called the Littman-Metcalf configuration.

On FIG. 2, each of the input single-mode fibers 1 to 5 ends has been represented, together with their optical cores 11, 21, 31, 41, 51, their claddings 12, 22, 32, 42, 52 and their coatings 13, 23, 33, 43, 53. In such a system, the input plane 6 defines, in its geometrical dimension x, the input function $F(\lambda)$ of the multiplexer, represented approximately on FIG. 2, each of the fibers cutting through an associated elementary passband 14, 24, 34, 44 and 54.

The widths $\Delta\lambda 1, \ldots, \Delta\lambda 5$ of each of these elementary bands depend on the diameters of the cores 11, 21, 31, 41, 51 of each single-mode optical fiber 1 to 5 and are generally small in relation to the distance $d(\lambda 1, \lambda 2), \ldots, d(\lambda 4, \lambda 5)$ separating the central wavelengths $\lambda 1, \ldots, \lambda 5$ of the elementary bands, consecutive to the beams provided by each input fiber 1 to 5 and superimposed on the output fiber 61.

We shall designate later on by $\Delta\lambda$ the width of the elementary bands $\Delta\lambda i, \ldots, \Delta\lambda n$ and by $d(\lambda i, \lambda i+1)$ the distance between the central wavelengths of two consecutive elementary bands.

Various propositions have already been made in order to increase the $\Delta\lambda/d(\lambda i, \lambda i+1)$ ratio. We know that this $\Delta\lambda/d(\lambda i, \lambda i+1)$ ratio $=\alpha/\delta$, where $\alpha$ corresponds to the diameter of the fundamental transmitted mode, which is substantially equal to the core diameter of the single-mode fiber and where $\delta$ is the distance between two cores of consecutive fibers. In practice, when the coating is removed, this $\delta$ distance is at least equal to the diameter of the cladding.

It has been suggested to reduce the thickness of the claddings 12, 22, 32, 42, 52, which enables reducing 8 and hence the distance $d(\lambda i, \lambda i+1)$ without reducing the widths of the bands $\Delta\lambda$. However, this lay-out is difficult to control and to implement.

Several other attempts have been made for improving the $\Delta\lambda/d(\lambda i, \lambda i+1)$ ratio. UK patent application N° 2.219.869 proposes to provide the multiplexer with waveguide having a tapered optical field spot size achieved, either by physically tapering the fibers, or by changing the core index at their ends by diffusion. This also is difficult to control and to implement.

D. R. Wisely in an article published in Electronics Letters ($14^{th}$ March 1991, vol. 27, N° 6) proposed to place a microlens array at the end of the fibers. Such an array enhances the relative bandwidth ratio and directs the light beams directly to the diffraction grating. To have these beams illuminating a common area on the grating and then to reduce loss, each of the microlenses has to be offset relatively to the core of the associated fiber; the amplitude of this offset depends on the position of the fiber which is possible using a microlens array having a pitch smaller than the pitch of the fiber ends and carefully controlled. In practice, this requires the microlens array to be manufactured to this particular use and the accurate relation between the pitch of the fiber ends and the pitch of the microlens array is difficult to obtain. Furthermore, the beams exciting the microlenses are slightly diverging because of diffraction since their diameter is limited by the small diameter of the microlenses. This yields astigmatism when these beams experience dispersion on the grating, which increases the loss of the device.

The purpose of the invention is to suggest an optical fiber wavelength optical multiplexer-demultiplexer which exhibits a significant improvement of the $\Delta\lambda/d(\lambda i, \lambda i+1)$ ratio, is easy to manufacture, can be realized with standard components easy to obtain and has a low loss.

It is another purpose of the invention to construct such multiplexing-demultiplexing device in which the elementary passband associated to each fiber is widened and shows front edges towards low frequencies and towards high frequencies which are as steep as possible and in which each transmitted wavelength undergoes the same attenuation. Such an elementary transfer function, ideally rectangular in shape, enables to obtain accurate delimitation of the passband and uniform transmission within this band.

To this end, the invention relates to an optical fiber wavelength multiplexing device comprising:

an array of input single-mode fibers designed for carrying light beams at different wavelengths $\lambda 1, \lambda 2, \ldots, \lambda n$, an output single-mode fiber designed for carrying the whole set of such light beams, a dispersing system receiving light beams form the input fibers in an input plane and generating superimposed light beams designed for the output fiber in an output plane, an array of converging microlenses being located in the input plane, whereas a microlens corresponds to each input fiber, wherein the microlens array has the same pitch as the input fiber an-ay and produces diverging beams whose respective central axes are parallel and which are directed to a collimating lens which produces collimated beams whose respective central axes are converging on the dispersing system.

According to the invention, it is also possible to construct a demultiplexing device. The device according to the previous alt described above with reference to FIGS. 1 and 2 can also operate in reverse direction, as a demultiplexer. The single-mode fiber 61 is then an input fiber carrying a light beam at various wavelengths and the fibers 1 to 5 become thus output fibers, each receiving a beam at a given wavelength, separated spatially from the beams coming out at the other wavelengths. Thus, although it will be mainly described embodied as a multiplexer, the invention can also be applied to such a demultiplexer.

The device according to the invention is then a fiber wavelength demultiplexer comprising an output fiber array designed for carrying light beams at different wavelengths λ1, . . . , λn, an input fiber designed for carrying the whole set of such light beams, a dispersing system receiving the light beam from the input fiber in an end plane and generating spatially separate light beams designed for the output fibers in an output plane,

- a converging microlens array is located in the output plane, whereas a microlens corresponds to each output fiber.

According to the invention, a collimating lens receives collimated beams whose respective central axes are diverging from the dispersing system and produces converging beams whose respective central axes are parallel and directed to the microlens array which has the same pitch as the output fiber array.

According to various embodiments each providing its particular advantages, the device of the invention embodies the following features

- the distance between the microlens array and the collimating lens is equal to the focal length of this collimating lens
- the distance between the collimating lens and the rear reflector of the dispersing system is equal to the modified focal length of the collimating lens
- a refracting prism is located between the dispersing system and the collimating lens;
- the dispersing system comprises a diffraction grating
- the diffraction grating is used alone in a Littow configuration and selves as the rear reflector of the dispersing system;
- the diffraction grating is used in a Littman-Metcalf configuration with a rear reflector;
- a retroreflecting dihedral is used as the real reflector of the dispersing system;
- the optical fibers exhibit advantageously a core of approximately 10 μm, a cladding of approximately 125 μm and a coating of approximately 250 μm, and the microlenses have a focal length of approximately 700 μm and a diameter of 250 μm approximately;
- the microlenses are made with a microlens array with index gradient
- the wavelengths are within the amplification range of erbium, between 1530 and 1565 nm;
- the frequency spacing is 200 GHz, 100 GHz, 50 GHz or 25 GHz;
- a filter is located on each channel, in order to flatten the associated elementary passbands;
- a Fabry-Perot filter is located in a superimposition zone of the channels and flattens all the elementary passbands at the same time;
- a phase mask is placed at the output of the common fiber to flatten all the elementary passbands.

The invention will be described in detail with reference to the appended drawings, in which:

FIG. 3 is a representation of a first embodiment of the invention;

FIG. 6 is a representation of a second embodiment of the invention;

FIG. 7 is a top view of the optical diagram of the device according to an improved embodiment of the invention with a refractive prism;

Figure 1:
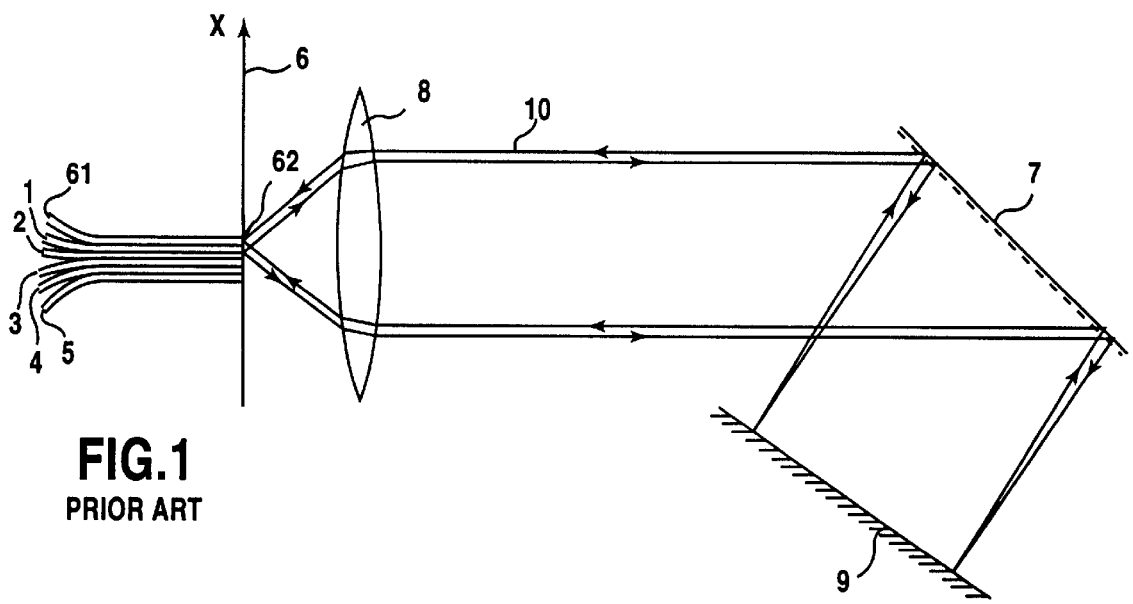
FIG. 1 is a representation of the optical diagram of a multiplexer of the prior art.
Figure 2:
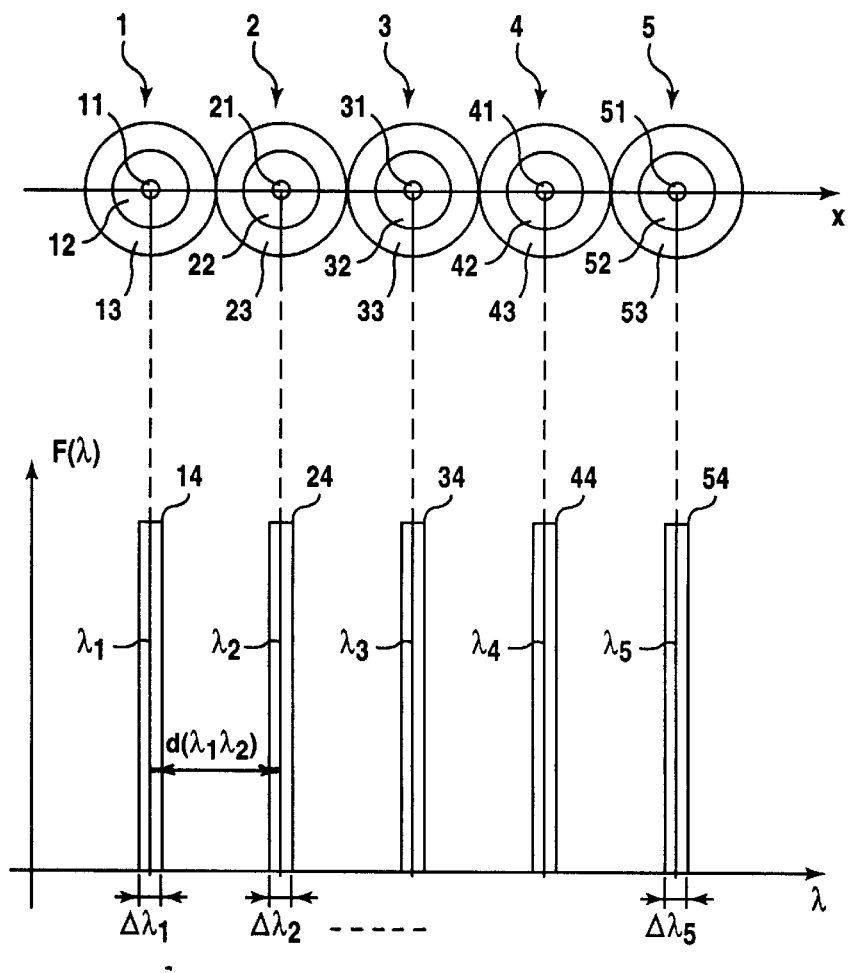
FIG. 2 is a diagrammatic representation showing the input function of the multiplexer of FIG. 1, in relation to the cross section of the input fibers.
Figure 4:
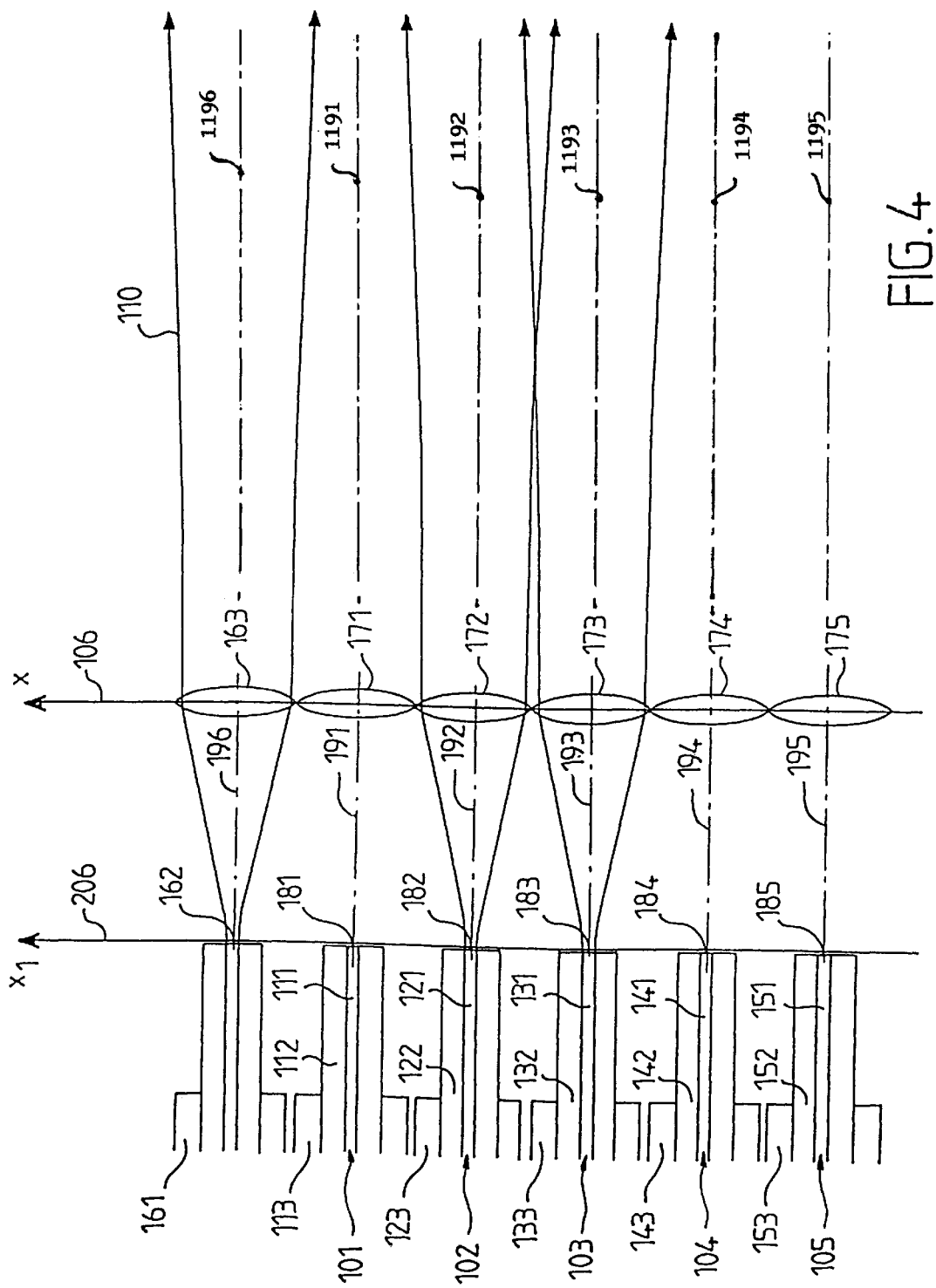
FIG. 4 is an enlarged view of a pair of the representation of FIG. 3.

The operation of the device according to the invention is thus illustrated by FIGS. 3 and 4. FIG. 3 represents a multiplexer. Input single-mode fibers 101 to 105 have their ends located on an end plane 206. This multiplexer comprises a dispersing element or grating 107 in a Littrow configuration and a collimating lens or optical element 108. It produces an output beam 110 collected by an output fiber 161. The optical elements of the multiplexer, the grating 107 and the collimating lens or optical element 108 are laid out in such a way that the input beams, spatially separated in the input plane 106, are superimposed at the output point 162 and coupled in the output single-mode fiber 161. The light rays represented approximately show the light path between the input fibers 101 and 105 and the output fiber 161 ; whereas the corresponding beams has respectively a wavelength λ1 and λ5.

FIG. 4 is an enlarged partial view, each of the single-mode fibers 101 to 105 has been represented with their optical cores 111, 121, 131, 141, 151, their claddings 112, 122, 132, 142, 152 and their coatings 113, 123, 133, 143, 153. The ends of the fibers are in an end plane 206 represented by the axis x1. In the input plane 106 represented by the axis x, are placed microlenses 163, 171, 172, 174, 175 equal in number to the input and output fibers, whereas each end 162 and 181 to 185 of the fibers lies at the focal point of the corresponding microlens 163 and 171 to 175. The optical axis (196, 191 . . . 195) of each microlens 163, 171 . . . , 175 is the same as the optical axis of the corresponding fiber end. The microlenses 163, 171 . . . , 175 thus form a microlens array that had the same pitch as the fibers ends 162, 181 . . . , 185 array. The distance between each of the fibers ends 162, 181 . . . , 185 to the corresponding microlenses 163, 171 . . . , 175 is advantageously approximately equal to the focal length of the microlenses.

The distance between the microlenses 163. . . 174, 175 and the collimating lens 108 is equal to the focal length f of the collimating lens 108 to get collimated beams. After the collimating lens, the central axes 2196 and 2191 to 2195 of these collimated beams are converging and they are superposed at a distance equal to the focal length f of the collimating lens, where one has to place the grating. The spacing between the axes of two consecutive input microlenses 171 to 175 is equal to the spacing between the axes of two consecutive fibers 101 to 105. In practice, it is interesting and possible that this spacing is greater than the diameter of the coatings 113, 123, 133, 143, 153. This enables simple positioning of the ends of the fibers, without curving, whether the coating at the end is removed or maintained.

As a result, the beams emerging from any of the fibers 101 . . . , 105 collected by the microlenses 171 . . . , 175 are directed by the collimating lens 108 to the same area of the reflector system 109 where they are superposed. On the way back, after reflection, they are coupled to the same fiber 161.

The light beams between the fiber ends 181 . . . , 185 and the microlenses 171 . . . , 175 are diverging and their central axes 191 to 196 are parallel. Since the mode-width is about 10 wavelengths, the divergence of the beams, due to the diffraction, is about $1/10$ rd. Between the microlenses and the collimating lens 108, they are still slightly diverging beams and their respective central axes 1191 . . . , 1196 are parallel one to another; the beam waist has a width of about 100 wavelengths, so that the divergence is about $1/100$ rd. Between the collimating lens 108 and the dispersing system 107, they are parallel collimated beams and their respective central axes 2191 to 2196 are converging on the dispersing system 107; the beam waist has then a width of about 1000 wavelengths and the corresponding divergence of $1/1000$ rd can be neglected. Therefore, dispersion on the grating of these collimated beams is done without astigmatism which avoids additional loss.

In this configuration, the best superposition of the beams oln the grating 107 (and therefore the lowest loss) is obtained when the distance from this grating 107 to the collimating lens 108 is identical to the distance between the microlenses 163, 171 . . . , 175 and the lens 108 and both are equal to f, the focal length of the collimating lens 108.

Figure 5:
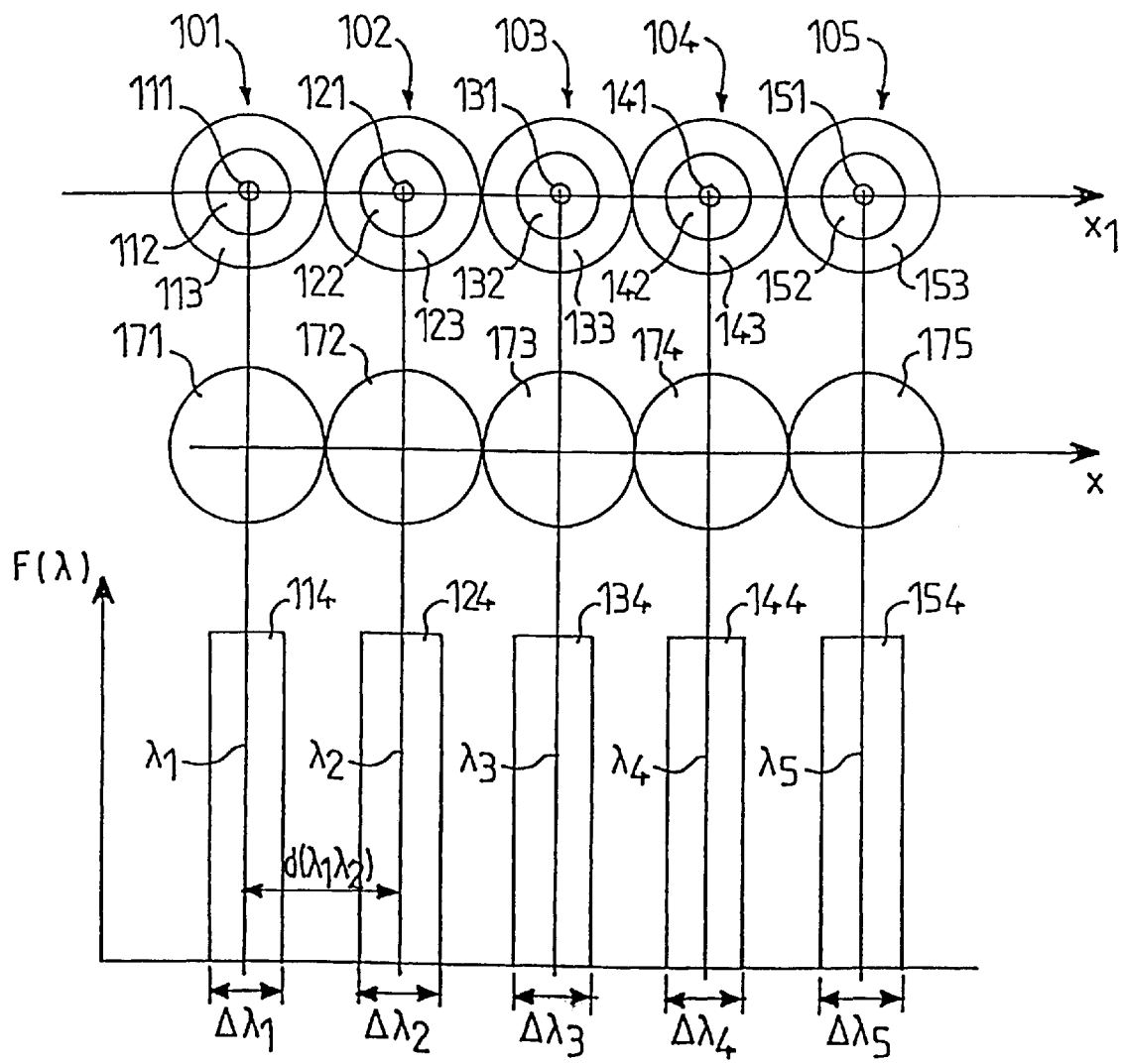
FIG. 5 is a diagrammatic representation showing the input function of the multiplexer of FIG. 3, in relation to the cross section of the input fibers.

Furthermore, in such a system, the input plane determines, in its geometrical size x, the input function $F(\lambda)$ of the multiplexer which is represented approximately on FIG. 5, whereas each fiber/microlens assembly cuts through an associated elementary passband 114, 124, 134, 144 and 154.

Indeed, the apparent dimension of the core of fibers 101 to 105 as seen by the dispersion device 107 is that of the zone of each microlens lit by the associated fiber. The diameter of this zone is thus much greater than the actual mode diameter of the fiber, which leads to significant widening of the elementary bands $\Delta\lambda 1, \Delta\lambda 2, \Delta\lambda 3, \Delta\lambda 4, \Delta\lambda 5$.

The widths $\Delta\lambda 1, \ldots, \Delta\lambda 5$ of each elementary band depending on the apparent diameter of the cores 111, 121, 131, 141, 151 of each optical fiber 101 to 105 are increased with respect to the corresponding values of fiber multiplexer without collecting microlenses, and this is obtained without changing the distances $d(\lambda 1, \lambda 2)$ separating the central wavelengths $\lambda 1, \ldots, \lambda 5$ of the beam provided by each input fiber 101 to 105 and superimposed on the output fiber 161. Thus, we obtain a larger $\Delta\lambda/d(\lambda i, \lambda i+1)$ ratio.

The microlenses 163 and 171 to 175 are advantageously planar microlenses with index gradient, constructed on a single common substrate. Such lenses are marketed by the NSG AMERICA, INC. which calls them "Planar Microlens Array (PML)". Thus, we obtain particularly satisfactory results which we may assume are due to the fact that the relative positioning of these lenses is particularly rigid and stable, that their overall adjustment is therefore simplified and that these lenses exhibit very similar optical properties in relation to one another, whereas their manufacturing process ensures very good reproducibility.

FIG. 5 shows diagrammatically the input spectral bands with steep front edge functions, which is a diagrammatic representation enabling very simple explanation of the invention. It is well-known that the shapes of these passbands are in reality quite close to gaussian curves.

The light signals used in telecommunication systems are generally laser beams whose spectral widths are narrow with respect to the elementary passbands of the multiplexer $\Delta\lambda 1$, . . . , $\Delta\lambda 5$. However, these wavelengths are liable to shift due to instabilities, for instance temperature variations. The widening of the elementary passbands $\Delta\lambda 1, \ldots, \Delta\lambda 5$ obtained according to the invention enables to improve the tolerance of the telecommunication systems in relation to these variations.

Thus, whatever the wavelengths of the beams addressed by the input fibers 101 to 105, providing each of them is comprised within the passband of the fiber which carries it, the said wavelengths are addressed on the fiber 161 and coupled to them with a constant attenuation.

So far, we have described a multiplexer. By reversing the operation, we can obtain a demultiplexer which will provide comparable advantages as regards the tolerances of the wavelengths processed. The fiber 161 thus becomes an input single-mode fiber carrying the multiplexed beam, at the various wavelengths. After demultiplexing, each of the output single-mode fibers 101 to 105 is coupled to the beam corresponding to a particular wavelength.

The wavelengths affected are advantageously those produced by the erbium over the band ranging from 1530 to 1565 nm.

The single-mode optical fibers have advantageously a core diameter of 10 $\mu$m, a cladding diameter of 125 $\mu$m and a coating diameter of 250 $\mu$m.

They are advantageously positioned, at their ends, in relation to one another, on silicon substrates in which V-shaped grooves have been engraved. Each of these grooves accommodates a fiber which is thus positioned accurately. They form a fiber array. The microlenses 163, 171 to 175 have advantageously a focal distance of approx. 500 $\mu$m–1 mm and a diameter of 250 $\mu$m. They form a microlens array. The collimating lens has advantageously a focal length f of several centimeters.

These microlenses 163 and 171 to 175 having themselves accurate, regular and stable dimensions, these microlenses and the ends of the fibers placed in grooves can then be easily aligned. As we have explained it previously, the microlens array and the fiber end array have the same pitch, so that it is possible to fix it to a standard value which makes it possible to get those components more easily, to precisely control the equality of the pitches and the regularity of the spacing of the fibers and of the microlenses. This common pitch is advantageously equal to 250 $\mu$m.

These microlenses 163, 171 to 175 are advantageously constructed in the form of a planar microlens array with index gradient.

The previous description refers to a Littrow configuration where the grating is the only component of the dispersing system. However, a Littman-Metcalf configuration is also possible. It is represented on FIG. 6 on which the same reference has been used to designate the same components as on FIG. 3. In such a Littman-Metcalf configuration, a rear reflector system 109 is implemented in the dispersing system. It receives the light beams from the grating 107 and redirects them back to it.

The rear reflector system 109 is an adjustment element whose orientation enables the selection of the wavelengths of the elementary passbands. The rear reflector system 109 is advantageously a dihedral, composed of two perpendicular planar mirrors and whose edge is parallel to the plane of dispersion of the grating, this plane being perpendicular to the grating lines.

When using such a rear reflector system 109, the light beam is twice dispersed by the grating 107 and the output and input planes are superimposed. In certain particular applications, the reflector system 109 can be replaced with an optical system making the diffracted light beam converging on an output fiber whose end is placed at its focal point.

In this Littman-Metcalf configuration, the collimated beams experience an anamorphosis a on the grating which is equal to the ratio between the width $w_1$ of the beam between the collimating lens 108 and the grating 107 and the width $w_2$ of the corresponding beam between the grating 107 and the reflector 109. One has $a=w_2/w_1$. This anamorphosis a yields an inverse change on the angular difference between the central axes of the various collimated beams, which modifies the distance where they overlap. Noting $d_1$, the distance between the collimating lens 108 and the grating 107, and $d_2$, the distance between the grating 107 and the reflector 109, the best superposition of the beams (and the lowest loss) is then obtained when $$d_1 + (d_2/a) = d_1 + \frac{d_2 w_1}{w_2} = f$$

where f is the focal length of the collimating length 108.

We call modified focal length, the distance $f_m=d_1+d_2$, where the collimated beams are superposed.

When the spacings between the ends of fibers 181, 182, . . . , 185 are equal, which in practice constitutes much simpler an embodiment than the determination of various spacings, the spacing between the wavelengths $d(\lambda 1, \lambda 2), \ldots, d(\lambda 4, \lambda 5)$ is not perfectly linear due to the dispersion law of the grating 7.

This non-linearity can be compensated for by the implementation of a refractive prism 200 (FIG. 7) between the collimating lens and the grating. This prism 200 generates an angular deviation of the light beams according to refraction laws. These laws are also non-linear, but since this non-linearity is set in the opposite direction to that introduced by the dispersion laws of the grating 107, the total non-linearity is pulled out. This can be set also to suppress non-linearity in frequency (inverse of wavelength). It is particularly interesting to set the frequency spacing to the standard values of D-WDM systems : i.e. 200 GHz, 100 GHz, 50 GHz or 25 GHz.

Note that this prism yields also an anamorphosis which changes the modified focal length and has to be taken into account to place the rear reflector.

Another detrimental effect liable to be introduced by the grating 107 is a dependence in relation to polarization.

When the transmitted power handling required imposes to avoid this dependence, it is possible to introduce a polarization splitter 201 followed by a plate $\lambda/2$ 202 on one of the beams between the microlens array and the grating 107, whereby the reflector 109 is a dihedral with an edge parallel to the dispersion plane of the grating 107. This is represented on FIGS. 8 and 9.

The polarization splitter 201 separates an incident beam 210 into a first and a second parallel secondary beams 211 and 212, with light linearly polarized along orthogonal directions. The plate $\lambda/2$ 202 is located on the path of the first secondary beam 211.

The first secondary beam 211 has its polarization direction parallel to the grating 107 lines, whereas the second secondary beam 212 has its polarization direction perpendicular to these lines. The plate 202 rotates the parallel polarization of the first secondary beam 211 in order to bring it into a perpendicular polarization. The first secondary beam 211 thus obtained and the second secondary beam 212 will both drive the grating 107 with linear polarization perpendicular to the lines. Thus, a lot of energy is saved, since the losses generated by diffraction on the grating 107 are reduced when this perpendicular polarization is used. The two beams are exchanged on the dihedral reflector and come back following exactly the same paths in opposite directions which because of reciprocity ensures a perfect balance of the transmission for both paths and therefore no polarization dependence.

Note that the polarization splitter acts as a parallel plate on the angular directions of the collimated beams and it is also changing the modified focal length.

Figure 8:
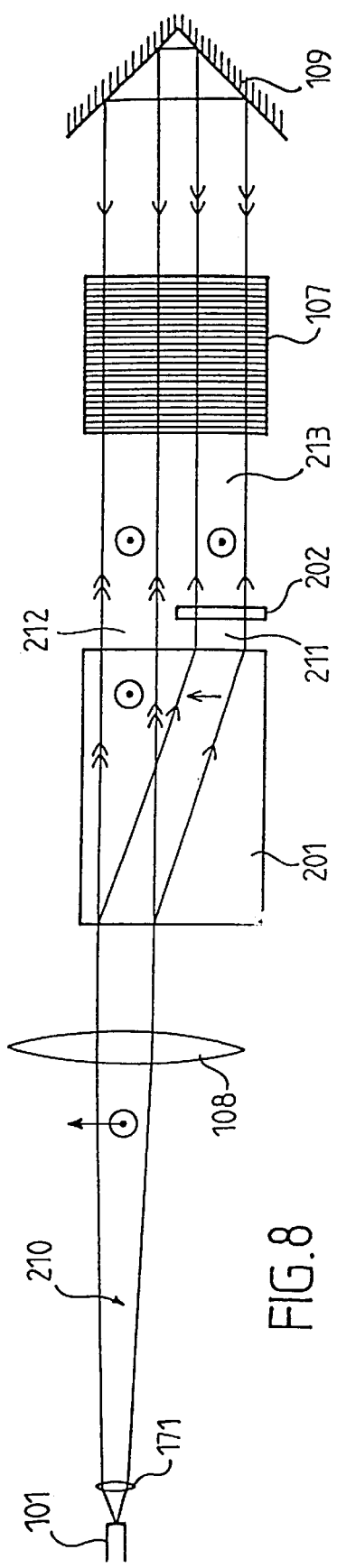
FIG. 8 is a side view of the optical diagram of the device according to a first improved embodiment of the invention with a polarization splitter.
Figure 9:
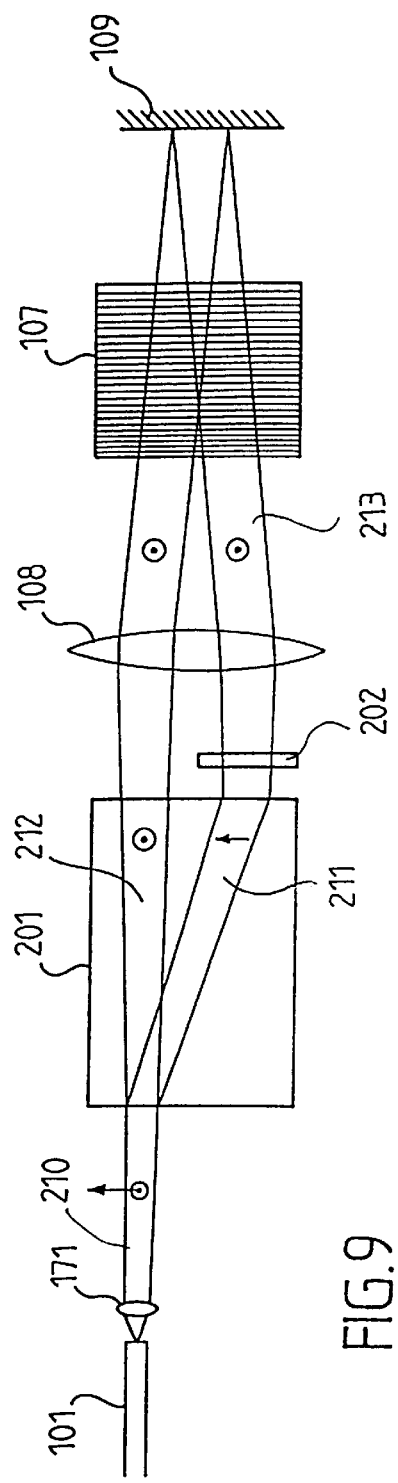
FIG. 9 is a side view of the optical diagram of the device according to a second improved embodiment of the invention with a polarization splitter.

The collimating lens 108 can be placed before the polarization splitter 201 as represented of FIG. 8, but it can also be placed after this polarization splitter as represented on FIG. 9. In this last case, the reflector 109 is a simple minor.

In order to bring each elementary passband 701 even closer to rectangular shape, it is possible to place an additional filter, acting on each of them. The additional filtering is centered on the same wavelength $\lambda i$ as the passband and slightly attenuates its peak. Thus, the passband is flattened.

This filtering can be performed individually for each wavelength. In the case of a multiplexer, a wavelength filter is then interposed on each channel between each input fiber and the multiplexer.

This filtering can also be performed by a single filter, for instance a Fizeau filter (i.e. a very low finesse Fabry-Perot), determined in such a way that its attenuation peaks are matched to that of the central wavelengths of the elementary bands of the multiplexer. A Fizeau filter is particularly interesting since its response is periodic in frequency, and the usual channel spacing used in DWDM systems is also periodic in frequency. This single filter can be accommodated in a superimposition region of the channels, either in the cavity of the multiplexer, in the superimposition region of the light beams, regardless of their wavelengths, between the grating 107 and the minor 109, or in front of the common fiber 161.

Figure 10A:
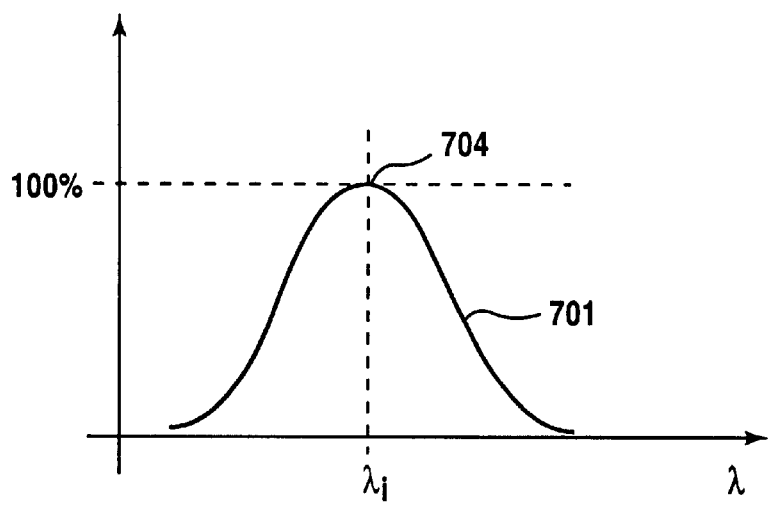
FIGS. 10a, 10b, 10c are a representation of the adjunction effect of attenuation filters.

FIG. 10*a* is a representation of an elementary passband 701 of the multiplexer without a filter, its peak 704 is centered on $\lambda i$.

Figure 10B:
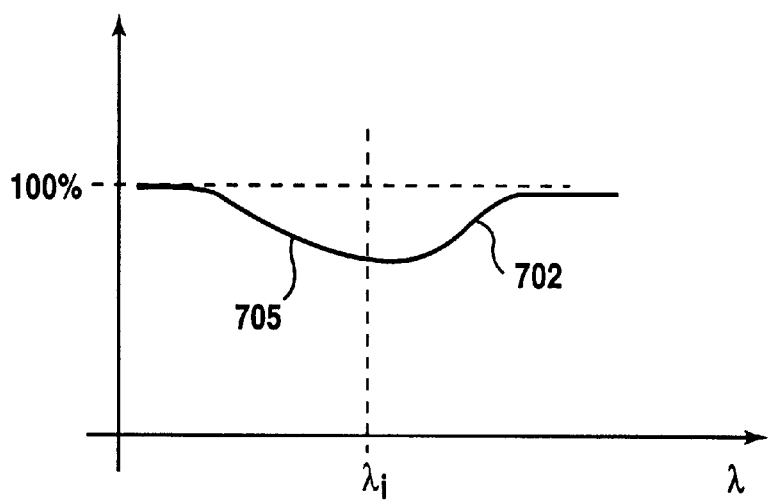
Figure 10C:
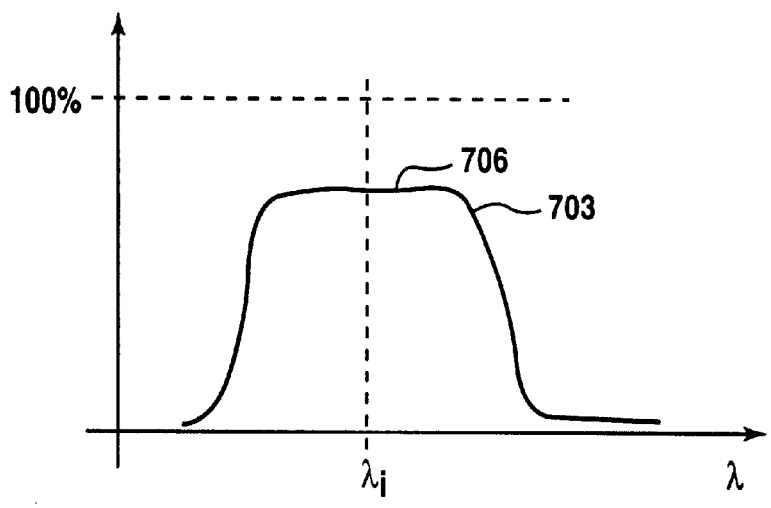

FIG. 10*b* is a representation of the passband 702 of a filter, its attenuation reaches a peak at 705 centered on $\lambda i$ and FIG. 10*c* represents the passband 703 resulting from the implementation of the additional filter, whereas the maximum transmission region 706 is flattened.

Figure 11A:
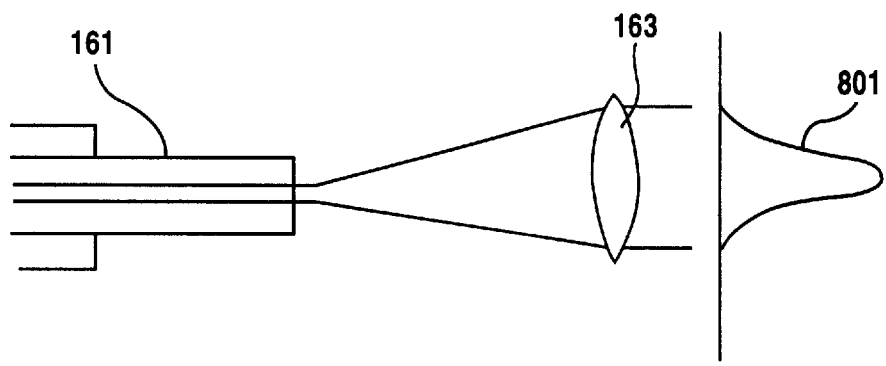
FIGS. 11a, 11b, 11c are a representation of the adjunction of a phase mask on the common fiber to get a flattened intensity distribution on the corresponding common microlens.
Figure 11B:
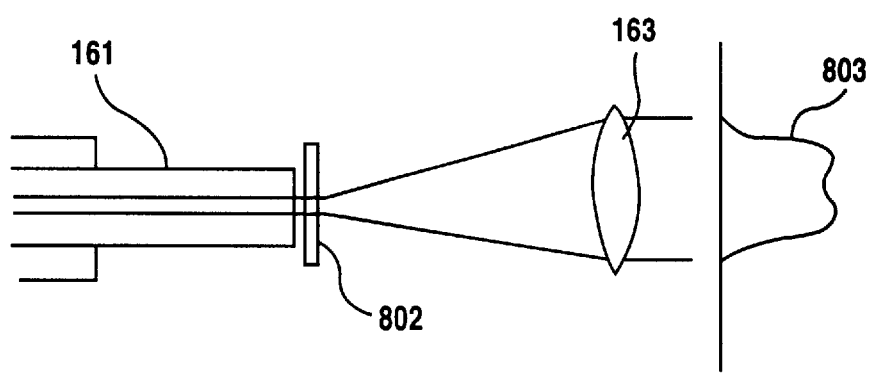

Another solution to get such a flattened response is to modify the usual gaussian light distribution 801 represented on FIG. 11*a* on the microlens 163 coming from the common fiber 161 (output fiber for the multiplexer, input fiber for the demultiplexer) to get a flattened light distribution 803. As shown on FIG. 11*b*, this can be performed with a phase mask 802 placed on the common fiber output 162.

Figure 11C:
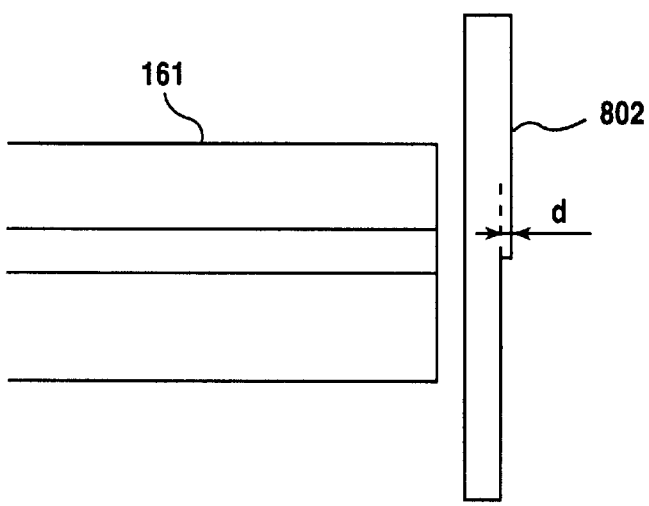

A phase mark 802 shown in an enlarged view on FIG. 11*c* is a transparent plate where grooves or steps are etched with a depth of several tenths of wavelengths. This induces a phase variation on a transmitted phase front. This phase variation is $\Delta\Phi=2\pi(n-1)\ d/\lambda$ where n is the index of the plate, d is the depth of the groove, and $\lambda$ the wavelength. Because of diffraction, a far field 803 is produced which is the Fourier transform of the modified phase front.

To get a flattened far field 803, several solutions are possible. Among them, a simple one is to use just a phase step of about $\pi/3$ radian which is centered on the fiber core.

The description has been made with reference to Figures representing five input fibers. This is a simple illustrative example, whereas a much greater number of fibers can be used, with the corresponding number of multiplexed or demultiplexed wavelengths, thanks to a single device complying with the invention.

The device was described with a collimating lens which is a single-element lens. To get a more compact device, the use of an additional a focal doublet or of additional anamoiphic prisms is possible and this would comply with the invention taking into account the actual modified focal length.

What is claimed is:

1. An optical fiber wavelength multiplexing device comprising:
    an array of input single-mode fibers (101 to 105) designed for carrying light beams at different wavelengths ($\lambda 1$, $\lambda 2$, ..., $\lambda n$),
    an output single-mode fiber (161) designed for carrying the whole set of such light beams,
    a dispersing system (107) receiving light beams from the input fibers (101 to 105) in an end plane and generating superimposed light beams designed for the output fiber (161) in an output plane,
    an array of converging microlenses (171 to 175) being located in the input plane, whereas a microlens corresponds to each input fiber, wherein the microlens array has the same pitch as the input fiber anlay and produces diverging beams whose respective central axes are parallel and which are directed to a collimating lens (108) which produces collimated beams whose respective central axes are converging to be superposed on the rear reflector of the dispersing system.

2. An optical fiber wavelength demultiplexing device comprising:
    an array of output single-mode fibers designed for carrying light beams at different wavelengths ($\lambda 1$, $\lambda 2$, ..., $\lambda n$),
    an input single-mode fiber designed for carrying the whole set of such light beams,
    a dispersing system receiving the light beam from the input fiber in an end plane and generating spatially separate light beams designed for the output fibers in an output plane,
    an array of converging microlenses located in the output plane, whereas a microlens corresponds to each output fiber, wherein a collimating lens (108) receives collimated beams whose respective central axes are diverging from the rear reflector of the dispersing system where they are superposed and produces converging beams whose respective central axes are parallel and directed to the microlens array which has the same pitch as the output fiber array.

3. A device according to claim 1 or 2, characterized in that the distance between the microlens array and the collimating lens is equal to the focal length of this collimating lens, and in that the distance between the collimating lens and the rear reflector of the dispersing system is equal to a modified focal length $f_m$ where the collimated beams are superposed.

4. A device according to claim 1 or 2, characterized in that it contains a refracting prism (200) located between the dispersing system and the collimating lens.

5. A device according to claim 1 or 2, characterized in that the dispersing system (107) comprises a diffraction grating.

6. A device according to claim 5, characterized in that the diffraction grating (107) is used in a Littrow configuration and acts as the rear reflector.

7. A device according to claim 5, characterized in that the diffraction grating (107) is used in a Littman-Metcalf configuration with an additional rear reflector.

8. A device according to any of claim 5 characterized in that it comprises a polarization splitter (201) between the microlens array and the grating.

9. A device according to claim 5, characterized in that the rear reflector is a retroreflecting dihedral located after the grating (107).

10. A device according to claim 1 or 2, characterized in that the optical fibers (161, 101 à 105) exhibit advantageously a core of approx. 10 $\mu$m, a cladding of approx. 125 $\mu$m and a coating of approx. 250 $\mu$m, and the lenses (163, 171 to 175) have a focal length of approx. 700 $\mu$m and a diameter of 250 $\mu$m approx.

11. A device according to claim 1 or 2, characterized in that the anlay of microlenses (163, 171 to 175) uses index gradient lenses.

12. A device according to claim 1 or 2, characterized in that the wavelengths ($\lambda 1$, ..., $\lambda n$) lie within the amplification range of erbium, between 1530 and 1565 nm.

13. A device according to claim 1 or 2, characterized in that the frequency spacing is 200 GHz, 100 GHz, 50 GHz or 25 GHz.

14. A device according to claim 1 or 2, characterized in that it contains a filter on each channel, in order to flatten the associated elementary passband.

15. A device according to claim 1 or 2, characterized in that it contains a Fizeau filter located in a superimposition zone of the channels and flattening all the elementary passbands.

16. A device according to claim 1 or 2, characterized in that a phase mask is placed at the output of the common fiber to flatten all the elementary passbands.

* * * * *